United States Patent [19]
White

[11] 3,750,858
[45] Aug. 7, 1973

[54] LOADING CONVEYOR FOR HARVESTERS

[75] Inventor: Allen A. White, Peabody, Kans.

[73] Assignee: Hesston Corporation, Hesston, Kans.

[22] Filed: Oct. 14, 1971

[21] Appl. No.: 189,204

[52] U.S. Cl. ............................................. 198/115
[51] Int. Cl. ........................................... B65g 21/12
[58] Field of Search .................... 198/109, 113–115, 198/87, 91; 212/46 R, 58, 59

[56] References Cited
UNITED STATES PATENTS

| | | | |
|---|---|---|---|
| 3,592,331 | 7/1971 | Morgan | 198/115 |
| 3,173,549 | 3/1965 | Bender | 212/46 R X |
| 1,297,852 | 3/1919 | Hudzinski | 198/87 |
| 2,544,553 | 3/1951 | Eakin | 212/46 R X |
| 199,666 | 1/1878 | Shepard | 198/115 |

Primary Examiner—Harvey C. Hornsby
Assistant Examiner—James W. Miller
Attorney—Schmidt et al.

[57] ABSTRACT

A potato harvester has a vertically swingable, potato-unloading conveyor segment, extensible laterally therefrom, and provided with a pair of articulated sections adapted to not only discharge the potatoes gently into the bottom of a container, but to be gradually raised as the potatoes pile up and are heaped above the top of the container. A special, combination hip joint and power lift connection for the sectional conveyor segment causes it to rise automatically so as to prevent damage thereto when accidentally bumped by the potato-receiving container of a trailer, truck or the like. The effective width of the harvester may be reduced for storage and over-the-road travel by tucking or folding the outer section in, under and between the harvester and the inner section.

15 Claims, 6 Drawing Figures

PATENTED AUG 7 1973

INVENTOR.
Allen A. White
BY
Schmidt, Johnson, Howy & Williams
ATTORNEYS.

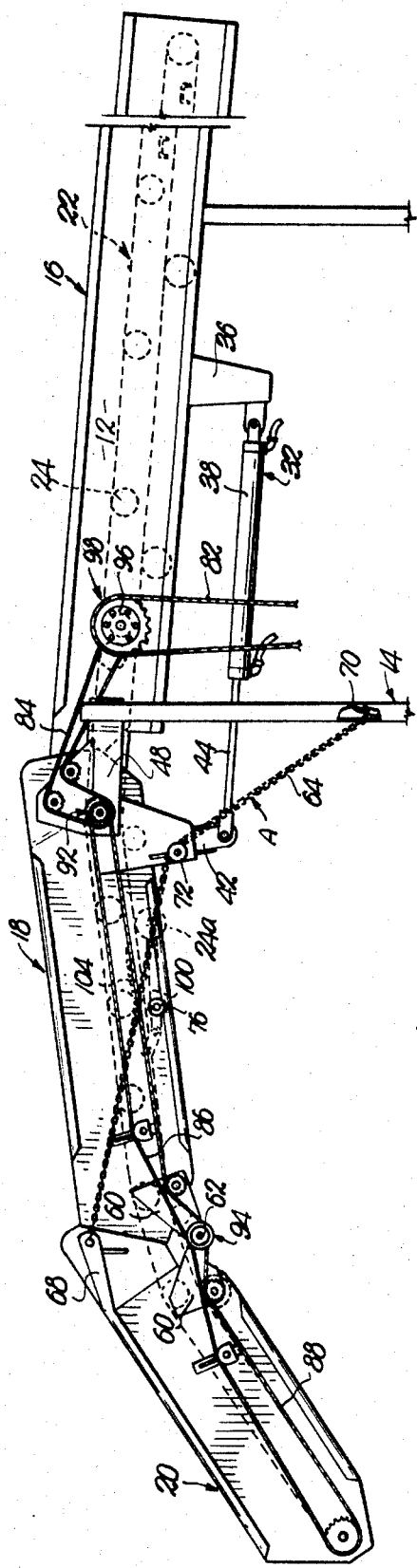

INVENTOR.
Allen A. White

LOADING CONVEYOR FOR HARVESTERS

It is an important object of the present invention to provide a conveyor for unloading potatoes from a harvester into the box of a truck or trailer during advancement through the field without damaging the potatoes, by the provision of articulated conveyor sections which may be looped over the side of the box so that the discharge end of the outer section is initially disposed adjacent the bed or bottom of the box.

Another important object of the present invention is the provision of an unloading conveyor segment for potato harvesters which may be progressively raised as the potatoes build up in the receiving box from the bottom of the latter to a heaped pile, while at the same time, maintaining the discharge end of the segment substantially within a vertical plane.

Still another important object of my present invention is to provide protection for the conveyor against damage resulting from accidental contact therewith by the box of the truck or trailer.

A further important object of my instant invention is the provision of an improved fold-in feature wherein the conveyor sections may be stored closely adjacent the harvester for over-the-road travel.

A still further object of the present invention is to provide a conveyor segment which may be folded down and away by use of the same power as is used to raise and lower the conveyor segment during operation, eliminating manual labor.

In the drawings:

FIG. 2 is a fragmentary, partially schematic side elevational view of the conveyor showing the outermost sectional segment thereof in one of its operating positions;

FIG. 3 is a fragmentary plan view of the conveyor;

Figure 1:
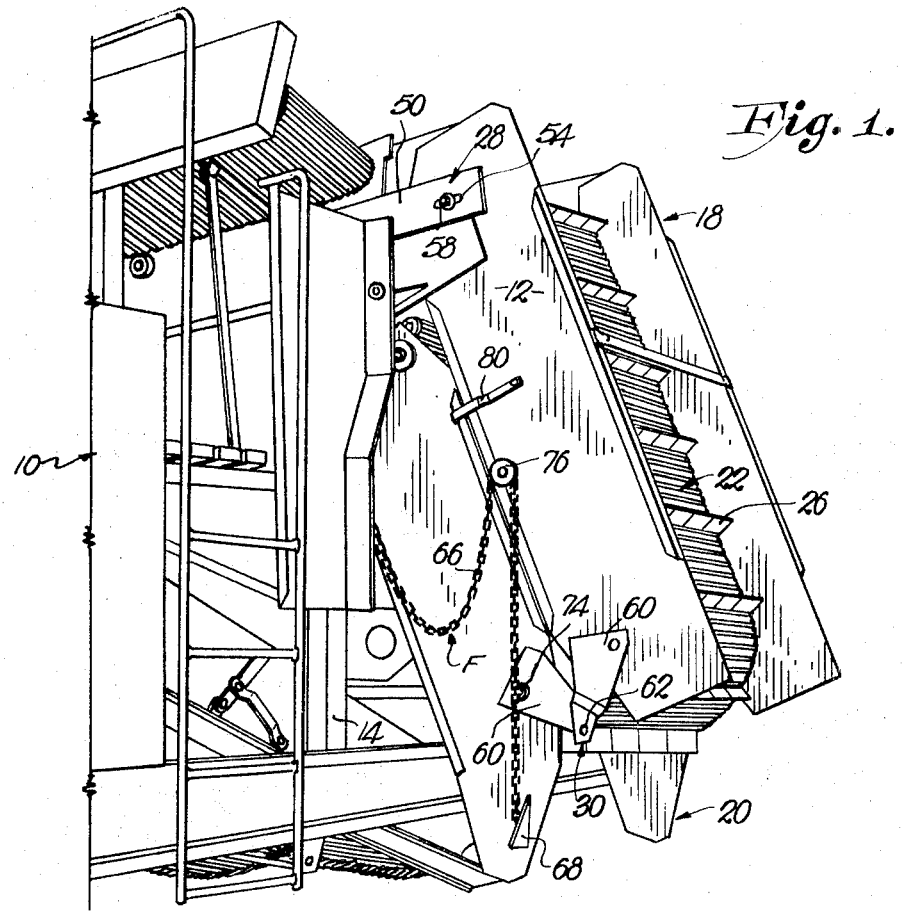
FIG. 1 is a fragmentary perspective view of a potato harvester having a potato unloading, front conveyor made in accordance with my present invention.

The nature and details of construction of potato harvester 10 shown in part by FIG. 1 are of no consequence to the present invention. Suffice it to simply point out that the potatoes are delivered to a front unloader conveyor 12 which extends transversely of the path of travel of harvester 10 and is carried by a support 14 constituting a part of the framework of the harvester 10. Conveyor 12 has a main segment 16 mounted on support 14 and a secondary segment which includes a pair of swingable sections, namely, an inner section 18 and an outer section 20.

Continuous chain assembly 22, carried by rollers 24, is common to the two segments and is provided with spaced flight links 26, the upper stretch of assembly 22 traveling from right to left, viewing FIGS. 2 and 3. A hip joint 28 mounts the section 18 on support 14 and a knee joint 30 attaches section 20 to section 18. A fluid pressure piston and cylinder assembly 32 is used to raise and lower the sections 18 and 20.

Segment 16 has a crossbar 34 beneath assembly 22 provided with a median, depending bracket 36 that pivotally receives one end of cylinder 38 of assembly 32, and section 18 has a crossbar 40 provided with a median, depending bracket 42 to which the outer end of ram 44 of assembly 32 is pivotally attached by a horizontal pintle 46.

The hip joint 28, presenting an articulation between section 18 and support 14, is made up of a pair of horizontally spaced arms 48 and 50, embracing section 18, extending outwardly and horizontally from support 14, and provided with horizontal slots 52 and 54 respectively, receiving corresponding trunnions 56 and 58 that extend outwardly in opposite directions from the sides of section 18. The knee joint 30, presenting an articulation between sections 18 and 20, includes a pair of overlapping hinge plates 60, rigid to each side respectively of each section 18 and 20 respectively, and interconnected by hinge pins 62.

Figure 5:
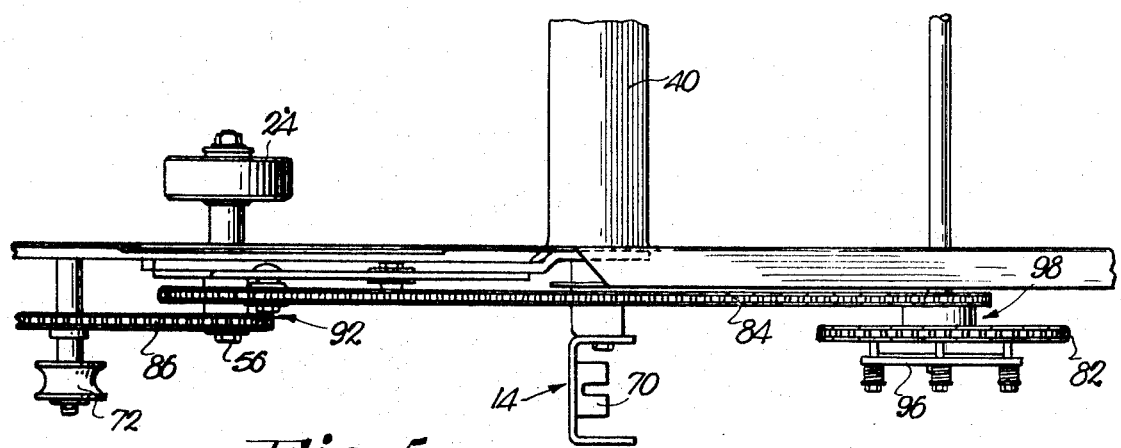
FIG. 5 is an enlarged fragmentary plan view similar to FIG. 3.

The section 20 and the support 14 are interconnected by a pair of flexible members, such as chains 64 and 66, the outer ends of which are anchored to brackets 68 at the inner end of section 20 and located directly above the hinge pins 62 when the sections 18 and 20 are disposed as shown in FIG. 2. Support 14 has slotted extensions 70, as best seen in FIG. 5, for receiving the links of chains 64 and 66, permitting adjustment of the effective lengths thereof.

In normal operation, when assembly 32 is used to raise and lower the sections 18 and 20, the chains 64 and 66 are trained or looped intermediate their ends over purchase means in the nature of chain guiding rollers 72 on the section 18 disposed adjacent the crossbar 40. When the sections 18 and 20 are to be stored into the position shown in FIG. 1, the chains 64 and 66 are trained or looped intermediate their ends over purchase means in the nature of chain guiding rollers 74 on those plates 60 which are secured to section 20. Additional projections 76 on the section 18 serve simply to stow the chains 64 and 66 when the sections 18 and 20 are in the position shown in FIG. 1.

Sections 18 and 20 are shown in FIGS. 2 and 3 substantially as will be their attitudes when unloading potatoes from the free end of section 20 into an empty truck body, for example. Assuming that the truck is being driven alongside and at the same speed as harvester 10, sections 18 and 20 will be looped over the proximal side of the truck and the free end of the section 20 will be adjacent the bed of the truck such that the distance of gravitational discharge of the potatoes, and therefore, damage thereto will be minimal. The position of chains 64 and 66, looped over rollers 72 in FIGS. 2 and 3, is designated by the letter A.

Figure 4:
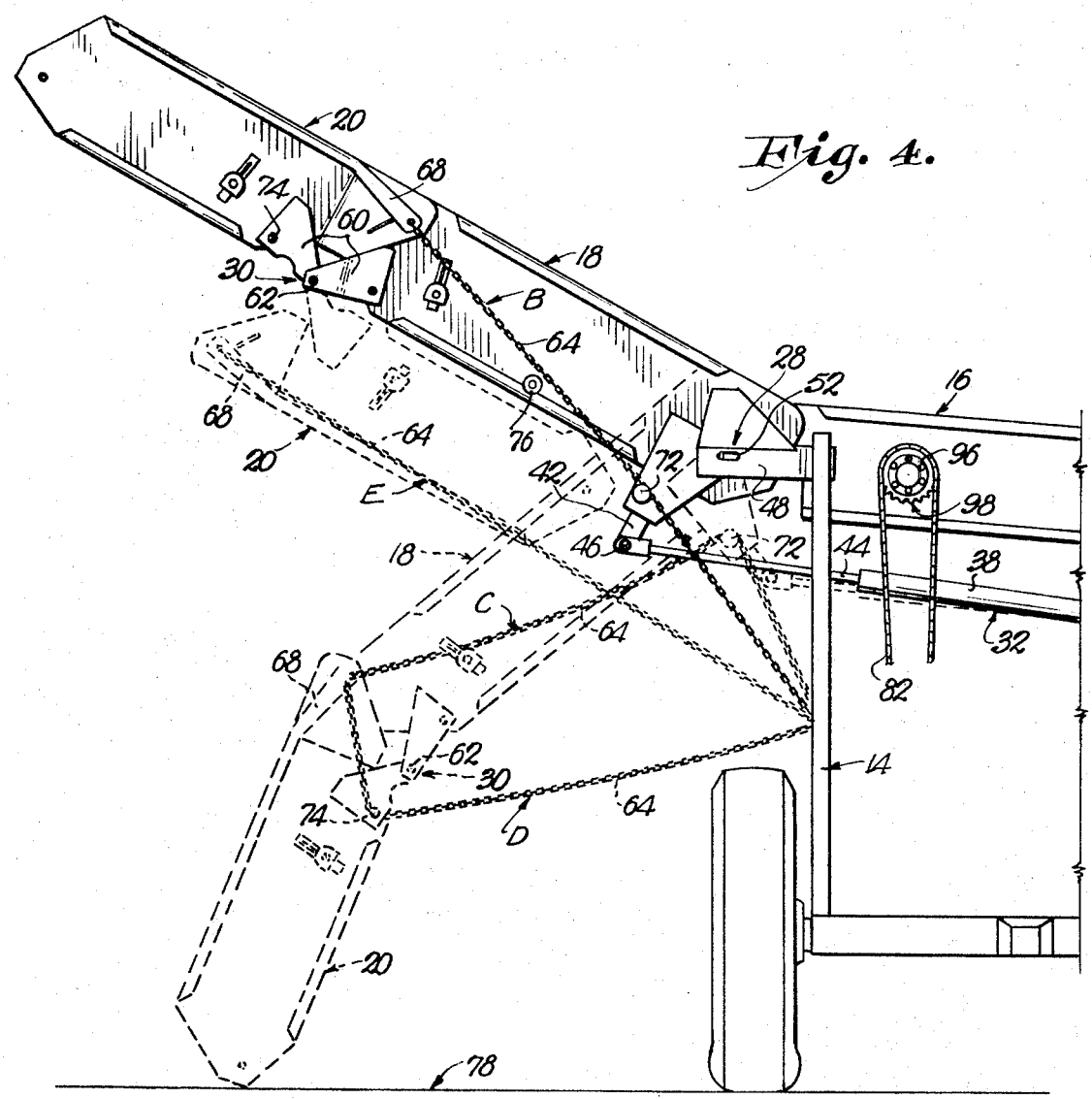
FIG. 4 is a fragmentary side elevational view similar to FIG. 2 illustrating a number of positions of the sectional segment of the conveyor.

As the potatoes pile up in the truck, it is but necessary to gradually extend the ram 44 and thereby raise the free discharge end of section 20 until the sections 18 and 20 reach the position shown by full lines in FIG. 4. As ram 44 swings section 18 upwardly about trunnions 56 and 58, the chains 64 and 66 cause section 20 to swing upwardly about hinge pins 62 until the sections 18 and 20 are in substantial end-to-end relationship, with chains 64 and 66 extending to positions B in FIG. 4, which are virtually straight lines from brackets 68 to extensions 70.

Noteworthy is the fact that as the sections 18 and 20 are raised, the outer free discharge end of section 20 travels substantially in a vertical plane such that the truck need not be moved closer to or farther away from the harvester 10 because of the height adjustments that are effected by operation of assembly 32. The potatoes may be heaped upon the truck well above the sides of its box as sections 18 and 20 are raised to the full line position of FIG. 4, and at all times, the dropping distance for the potatoes need not be excessive. The chains 64 and 66 should be adjusted in extension 70 such that on the fully extended stroke of ram 44 the section 20 will not be swung clockwise, viewing FIG. 4, beyond its position aligned with section 18.

In order to place the sections 18 and 20 into the condition shown by FIG. 1, the ram 44 is first retracted to lower the section 20 onto the ground 78, causing chains 64 and 66 to assume position C in FIG. 4. The chains 64 and 66 are then removed from the rollers 72 and looped beneath the rollers 74, thereby establishing position D for chains 64 and 66 in FIG. 4. Ram 44 is thereupon extended to raise section 18 and, at the same time, cause section 20 to swing anticlockwise, viewing FIG. 4, about hinge pins 62 to a position underlying section 18 as illustrated in FIG. 4. In this attitude of the sections 18 and 20, chains 64 and 66 are in positions E extending in straight lines from brackets 68 to extensions 70. One or more spring catches 80 (FIG. 1) on section 18 receive section 20 and releasably hold it locked to section 18. Ram 44 is then retracted to lower the sections 18 and 20 and thereby tuck and fold the section 20 in and behind the section 18 as shown in FIG. 1. Chains 64 and 66 are removed from rollers 74 and placed into position F looped over projections 76, ready for over-the-road travel.

On occasion, when the speeds of the potato receiving trucks and the harvester 10 are not properly coordinated or when the trucks are driven into position for receiving the potatoes before the sections 18 and 20 are raised high enough to clear the sides of the truck box, the conveyor 12 is damaged because of the lateral impact against the outer end of section 20. Such damage can be avoided by virtue of the slots 52 and 54 and the trunnions 56 and 58 of hip joint 28. As shown in FIG. 4, when the lateral impact is against that side of section 20 adjacent chain 66, trunnion 58 is shifted in slot 54 toward the support 14. Pintle 46 acts as a fulcrum about which the section 18 rocks, causing the outer end of section 20 to rise a distance equal to the amount of lateral deflection of section 20, clearing the side of the truck and permitting the truck driver to take corrective steps before damaging the conveyor 12.

Figure 6:
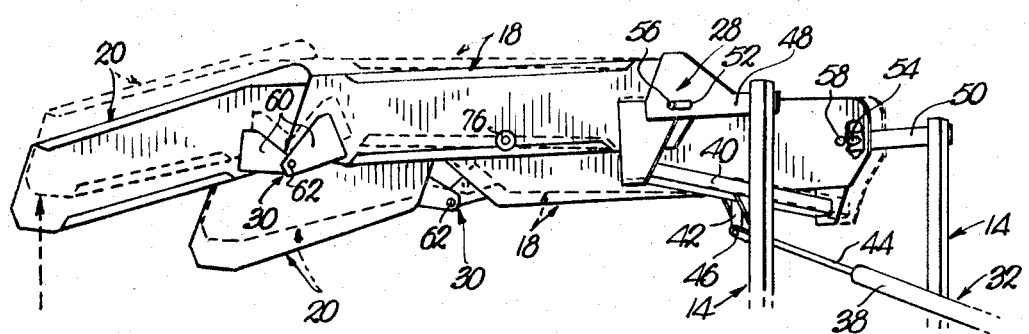
FIG. 6 is a fragmentary side elevational view illustrating the action which takes place when the outer section is accidentally engaged with a lateral impact.

It has been found in practice that if the harvester 10 is at standstill and the section 20 is not quite high enough to clear the side of the truck when the latter is being driven into position beneath the section 20, the rise in section 20 is sufficient to prevent damage within the reaction time for bringing the truck to a stop. Or, if the impact occurs while the truck and the harvester 10 are in motion, corrective steps can be taken by the truck driver during the rise of section 20 to the position illustrated by dotted lines in FIG. 6. Manifestly, if the impact is in the opposite direction, trunnion 56 shifts in slot 52 toward support 14 to cause the same rise in section 20 coincident with and in response to its lateral deflection.

The assembly 22 is driven by four chains 82, 84, 86 and 88, the latter of which drives a pair of sprocket wheels which receive assembly 22 at the outer end of section 20, one only of which is shown in FIG. 3 and designated 90. Hip joint 28 is rendered functional by training chains 84 and 86 over a double sprocket wheel unit 92 on trunnion 56, and knee joint 30 is permitted to operate by training chains 86 and 88 over a double sprocket wheel unit 94 on the proximal hinge pin 74. Chain 82 drives chain 84 through a slip clutch 96 and a double sprocket wheel unit 98 carried by segment 16.

The lower stretch of assembly 22 is kept taut during swinging of sections 18 and 20 by vertically swingable, spring loaded arms 100 on section 18 supporting a shaft 102 having rollers 24a. Springs 104 on section 18, operably coupled with arms 100, yieldably bias the latter downwardly.

Having thus described the invention, what is claimed as new and desired to be secured by Letters Patent is:

1. In a materials handling assembly:
    as elongated conveyor having a main segment and a secondary segment;
    an articulation, presenting a joint for vertical swinging movement of the secondary segment relative to the main segment; and
    power means coupled with the secondary segment for raising and lowering the latter,
    said joint having parts movable relatively in response to lateral forces applied to said secondary segment such as to raise the same independently of said power means.

2. In a materials handling assembly as claimed in claim 1, said power means including a reciprocable ram having a horizontally disposed pintle pivotally coupling the same with the secondary segment beneath the latter and swingable during actuation of the ram within a medial upright plane normal to and intersecting the axis of said joint.

3. In a materials handling assembly as claimed in claim 2, said joint including a pair of opposed, horizontal trunnions spaced above said pintle and constituting the axis of swinging movement of said secondary segment and said pintle.

4. In a materials handling assembly as claimed in claim 3, there being a support provided with horizontal slots receiving said trunnions for reciprocable movement of the latter along the slots whereby the secondary segment rises about said pintle as a fulcrum in response to said lateral forces.

5. In a materials conveyor:
    a support;
    an inner conveyor section;
    an articulation between said section and the support, presenting a hip joint;
    power means coupled with said section for swinging the latter about said joint;
    an outer conveyor section;
    an articulation between said sections, presenting a knee joint; and
    structure for swinging the outer section about said knee joint during actuation of the power means,
    said hip joint having parts movable relatively in response to forces applied to the outer section such as to swing the sections in one direction independently of said power means.

6. In a materials conveyor as claimed in claim 5, said structure being adapted to fold the sections into overlapping relationship.

7. In a materials conveyor as claimed in claim 6, said power means being adapted to fold the sections into a stored position alongside the support when the sections are in overlapping relationship.

8. In a materials conveyor:

a support;
an inner conveyor section;
an articulation between said section and the support, presenting a hip joint for vertical swinging movement of said section relative to the support;
power means coupled with said section for raising and lowering the latter;
an outer conveyor section;
an articulation between said sections, presenting a knee joint for vertical swinging movement of said outer section with the inner section and relative thereto; and
structure for raising the outer section relative to the inner section as the sections are raised by the power means and for lowering the outer section relative to the inner section as the sections are lowered by the power means,
said hip joint having parts movable relatively in response to lateral forces applied to the outer section such as to raise the sections independently of said power means.

9. In a materials conveyor as claimed in claim 8, said structure being adapted to fold the outer section downwardly and inwardly into underlying relationship to the inner section.

10. In a materials conveyor as claimed in claim 9, said power means being adapted, after the outer section has been placed beneath the inner section, to fold the sections into a stored position with the outer section interposed between the support and the inner section.

11. In a materials conveyor:
a support;
an inner conveyor section;
an articulation between said section and the support, presenting a hip joint for vertical swinging movement of said section relative to the support;
power means coupled with said section for raising and lowering the latter;
an outer conveyor section;
an articulation between said sections, presenting a knee joint for vertical swinging movement of said outer section with the inner section and relative thereto; and
structure for raising the outer section relative to the inner section as the sections are raised by the power means and for lowering the outer section relative to the inner section as the sections are lowered by the power means,
said power means including a reciprocable ram having a horizontally disposed pintle pivotally coupling the same with the inner section beneath the latter and swingable during actuation of the ram within a medial upright plane normal to and intersecting the axis of said hip joint,
said hip joint including a pair of opposed, horizontal trunnions spaced above said pintle and constituting the axis or swinging movement of said inner section and said pintle,
said support being provided with horizontal slots receiving said trunnions for reciprocable movement of the latter along the slots whereby the sections rise automatically about said pintle as a fulcrum when lateral forces in either of two directions are applied to the outer section.

12. In a materials conveyor:
a support;
an inner conveyor section;
an articulation between said section and the support, presenting a hip joint for vertical swinging movement of said section relative to the support;
power means coupled with said section for raising and lowering the latter;
an outer conveyor section;
an articulation between said sections, presenting a knee joint for vertical swinging movement of said outer section with the inner section and relative thereto; and
structure for raising the outer section relative to the inner section as the sections are raised by the power means and for lowering the outer section relative to the inner section as the sections are lowered by the power means,
said structure including a flexible member interconnecting the outer section and the support,
said inner section being provided with purchase means over which said member is normally trained between the support and the outer section,
said member, upon removal thereof from said purchase means, folding the inner section downwardly and inwardly into underlying relationship to the inner section as the latter is raised by said power means,
said power means being adapted, after the outer section has been placed beneath the inner section, to lower the sections into a stored position with the outer section interposed between the support and the inner section,
said power means including a reciprocable ram having a horizontally disposed pintle pivotally coupling the same with the inner section beneath the latter and swingable during actuation of the ram within a medial upright plane normal to and intersecting the axis of said hip joint,
said hip joint including a pair of opposed, horizontal trunnions spaced above said pintle and constituting the axis of swinging movement of said inner section and said pintle,
said support being provided with horizontal slots receiving said trunnions for reciprocable movement of the latter along the slots whereby the sections rise automatically about said pintle as a fulcrum when lateral forces in either of two directions are applied to the outer section.

13. In a materials conveyor:
a support;
an inner conveyor section;
an articulation between said section and the support presenting a hip joint for vertical swinging movement of said section relative to the support;
power means coupled with said section for raising and lowering the latter;
an outer conveyor section;
an articulation between said sections, presenting a knee joint for vertical swinging movement of said outer section with the inner section and relative thereto; and
structure selectively operable, in response to raising of the inner section by said power means, to forcibly raise the outer section relative to the inner section or forcibly fold the outer section downwardly into underlying relationship to the inner section.

14. In a materials conveyor as claimed in claim 13, wherein said structure includes a flexible member interconnecting the outer section and the support, and multiple purchase means over which said member may be selectively trained.

15. In a materials conveyor as claimed in claim 14, wherein said purchase means includes a first component on said inner section for use in forcibly raising the outer section and a second component on said outer section for use in forcibly folding the outer section.

* * * * *